(12) United States Patent
Takano

(10) Patent No.: US 9,933,260 B2
(45) Date of Patent: Apr. 3, 2018

(54) MOBILE ELECTRONIC EQUIPMENT WITH GYRO SENSOR, GYRO SENSOR CORRECTION METHOD, AND PROGRAM

(75) Inventor: Satoshi Takano, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 1266 days.

(21) Appl. No.: 14/000,078

(22) PCT Filed: Feb. 17, 2012

(86) PCT No.: PCT/JP2012/053768
§ 371 (c)(1),
(2), (4) Date: Aug. 16, 2013

(87) PCT Pub. No.: WO2012/111793
PCT Pub. Date: Aug. 23, 2012

(65) Prior Publication Data
US 2013/0325386 A1   Dec. 5, 2013

(30) Foreign Application Priority Data

Feb. 18, 2011   (JP) ................................. 2011-033012

(51) Int. Cl.
*G01C 19/5776* (2012.01)
*G01C 19/00* (2013.01)
(Continued)

(52) U.S. Cl.
CPC ......... *G01C 19/5776* (2013.01); *G01C 19/00* (2013.01); *G01C 25/005* (2013.01);
(Continued)

(58) Field of Classification Search
CPC .. G01C 19/5776; G01C 25/005; G01C 19/00; H04M 1/0243; H04M 2250/12; H04M 1/0214
See application file for complete search history.

(56) References Cited

U.S. PATENT DOCUMENTS

2010/0106451 A1* 4/2010 Sugihara ................. G01P 13/00
702/147
2011/0065473 A1* 3/2011 Kimishima ............ G01C 21/16
455/556.1

FOREIGN PATENT DOCUMENTS

CN   101233390 A   7/2008
JP   02-247521 A   10/1990
(Continued)

OTHER PUBLICATIONS

Translation of JP 2006-234710.*
(Continued)

*Primary Examiner* — Mohamed Charioui
*Assistant Examiner* — Jeremy Delozier
(74) *Attorney, Agent, or Firm* — Sughrue Mion, PLLC

(57) ABSTRACT

A mobile electronic equipment includes a gyro sensor that detects an angular velocity, a first housing with the gyro sensor disposed therein, a second housing movably connected to the first housing, an angle formed between the respective housings being changed by movement of the first housing, and a control unit that calculates a change in an angle formed between the first housing and the second housing before and after the movement as a measured angle, based on output data of the gyro sensor. The control unit calculates a correction value for the output data of the gyro sensor based on the measured angle and a reference angle set in advance (see FIG. 1).

14 Claims, 12 Drawing Sheets

(51) Int. Cl.
*G01C 25/00* (2006.01)
*H04M 1/02* (2006.01)

(52) U.S. Cl.
CPC ........ *H04M 1/0243* (2013.01); *H04M 1/0214* (2013.01); *H04M 2250/12* (2013.01)

(56) References Cited

FOREIGN PATENT DOCUMENTS

| | | |
|---|---|---|
| JP | 07-071964 A | 3/1995 |
| JP | 10-122865 A | 5/1998 |
| JP | 2006-234710 A | 9/2006 |
| JP | 2010-152587 A | 7/2010 |

OTHER PUBLICATIONS

Communication dated Mar. 26, 2015 from the State Intellectual Property Office of the People's Republic of China in counterpart application No. 201280009174.3.
Communication dated Nov. 27, 2017, from the European Patent Office in counterpart European Application No. 12747354.4.

* cited by examiner

_US 9,933,260 B2_

MOBILE ELECTRONIC EQUIPMENT WITH GYRO SENSOR, GYRO SENSOR CORRECTION METHOD, AND PROGRAM

TECHNICAL FIELD

Cross-Reference to Related Applications

This application is a National Stage Entry of PCT/JP2012/053768 filed Feb. 17, 2012, which in turn is based upon and claims the benefit of the priority of Japanese patent application No. 2011-033012 filed on Feb. 18, 2011, the disclosures of all of which are incorporated herein in their entirety by reference thereto.

The present invention relates to a mobile electronic equipment with a gyro sensor, a gyro sensor correction method, and a program. More specifically, the invention relates to correction of the gyro sensor of a mobile electronic equipment in which a mode change can be made.

BACKGROUND

Recently, the number of mobile electronic equipments such as cellular phones including gyro sensors has increased. A gyro sensor has been used for a long time in order to achieve detection of the attitude of a mobile electronic equipment or to implement a navigation system. Further, recently, with high functionalization of the mobile electronic equipment, there is a strong demand for use of the gyro sensor to detect the rotational speed or the rotation angle of the mobile electronic equipment so as to implement an application for a game or health management (including detection of a manner of walking)

The mobile electronic equipment often uses the gyro sensor of a type for detecting an angular velocity using a Coriolis force applied to a vibrating object. In such a gyro sensor, a zero-point offset will occur due to temperature change or change with time. Thus, calibration (calibration) is needed. It is because, when the gyro sensor is used without performing the calibration, measurement accuracy of the gyro sensor deteriorates, so that the gyro sensor is not workable.

Patent Literature 1 discloses a technique for transitioning a mobile electronic equipment to a usual power mode during a low power consumption mode of the mobile electronic equipment to execute calibration of a gyro sensor, even if the gyro sensor has not been used for a long time and a zero-point offset has occurred.
Patent Literature 1:
JP Patent Kokai Publication No. JP2010-152587A

SUMMARY

The entire disclosure of Patent Literature 1 is incorporated herein by reference. The following analysis has been made in terms of the present invention.

In principle, the zero-point offset occurs in the vibration-type gyro sensor, as mentioned above. In a state where an equipment including the gyro sensor is stationary, zero should be output from the gyro sensor. However, an offset (of a given value) is output, though the gyro sensor is stationary. This phenomenon is called the zero-point offset. This offset occurs even when the equipment including the gyro sensor is performing a rotating operation.

For calibrating the offset, there may be considered the following method. In this method, the equipment including the gyro sensor is immobilized for several seconds, and a deviation of the zero point of the gyro sensor is measured and stored. Then, when using an output of the gyro sensor, the amount of the deviation is reflected on a value to be output from the gyro sensor. Such a calibration method, however, is acceptable if a gyro sensor mounted in an industrial equipment is calibrated. However, there is a problem with this method when this method is used for calibrating a gyro sensor mounted in an equipment such as a mobile electronic equipment.

The reason for this problem is as follows. It is premised that the mobile electronic equipment is used by being carried around. Thus, creation of the stationary state of the mobile electronic equipment by a user leads to an operation that does not originally need to be aware of by the user. Thus, the user may feel inconvenience of the mobile electronic equipment.

On the other hand, a change in ambient temperature around the mobile electronic equipment may also cause the offset of the gyro sensor. When the offset of the gyro sensor occurs due to a change in ambient temperature around the mobile electronic equipment, calibration of the gyro sensor may also be performed by using a temperature sensor. This calibration is a method in which the temperature sensor is operated simultaneously when the gyro sensor is used, and an output value of the gyro sensor is corrected according to the temperature detected by the temperature sensor. The gyro sensor has a temperature characteristic that is different for each of mobile electronic equipments. Thus, when such a calibration method is employed, it is necessary to obtain information on an offset value with respect to temperature for each of mobile electronic equipments because the temperature characteristic differs for each of mobile electronic equipments. A lot of inspection steps will be therefore generated so as to obtain this temperature characteristic of the gyro sensor for each of mobile electronic equipments, leading to an increase in the cost of the mobile electronic equipment. Thus, there is a problem with this calibration method.

As described above, the related arts have the problems to be solved.

In an aspect of the present invention, there are desired a mobile electronic equipment with a gyro sensor in which calibration of the gyro sensor is executed without a user being aware of the calibration, a correction method of the gyro sensor, and a program.

According to a first aspect of the present disclosure, there is provided a mobile electronic equipment comprising: a gyro sensor that detects an angular velocity; a first housing with the gyro sensor disposed therein; a second housing movably connected to the first housing, an angle formed between the respective housings being changed by movement of the first housing; and a control unit that calculates a change in an angle formed between the first housing and the second housing before and after a movement as a measured angle, based on output data of the gyro sensor, and calculates a correction value for the output data of the gyro sensor based on the measured angle and a reference angle set in advance.

According to a second aspect of the present disclosure, there is provided a method of correcting a gyro sensor of a mobile electronic equipment comprising: using a mobile electronic equipment which comprises a gyro sensor that detects an angular velocity; a first housing with the gyro sensor disposed therein; and a second housing movably connected to the first housing, an angle formed between the respective housings being changed by movement of the first housing, the method further comprising: calculating a change in an angle formed between the first housing and the second housing before and after a movement as a measured angle, based on output data of the gyro sensor; and calculating a correction value for the output data of the gyro sensor based on the measured angle and a reference angle set in advance. This method is associated with a specific machine, which is the mobile electronic equipment comprising the gyro sensor that detects the angular velocity, the first housing with the gyro sensor disposed therein, and the second housing movably connected to the first housing, the angle formed between the respective housings being changed by movement of the first housing.

According to a third aspect of the present disclosure, there is provided a program for causing a computer that controls a mobile electronic equipment, wherein the program executes by using a mobile electronic equipment comprising: a gyro sensor that detects an angular velocity; a first housing with the gyro sensor disposed therein; and a second housing movably connected to the first housing, an angle formed between the respective housings being changed by movement of the first housing, the program causing the computer to execute processes of: calculating a change in an angle formed between the first housing and the second housing before and after a movement as a measured angle, based on output data of the gyro sensor; and calculating a correction value for the output data of the gyro sensor based on the measured angle and a reference angle set in advance. This program can be recorded in a computer readable storage medium. That is, the present invention can also be embodied as a computer program product. The storage medium can be set to a non-transient storage medium such as a semiconductor memory, a hard disk, a magnetic recording medium, or an optical recording medium.

According to each aspect of the present invention, there are provided the mobile electronic equipment with the gyro sensor in which calibration of the gyro sensor is executed without a user being aware of the calibration, the correction method of the gyro sensor, and the program.

PREFERRED MODES

First, an overview of an exemplary embodiment will be described, using FIG. 1. A reference sign in each of drawings appended to this overview is appended to each element as an example of help understanding, and does not intend to limit the present invention to the modes that have been illustrated.

In principle, an offset drift will occur in a gyro sensor, as described above. For that reason, calibration of the gyro sensor is essential for a mobile electronic equipment including the gyro sensor. However, when a user is forced to perform a special operation in order to perform the calibration, there is a problem in terms of convenience.

Figure 1:
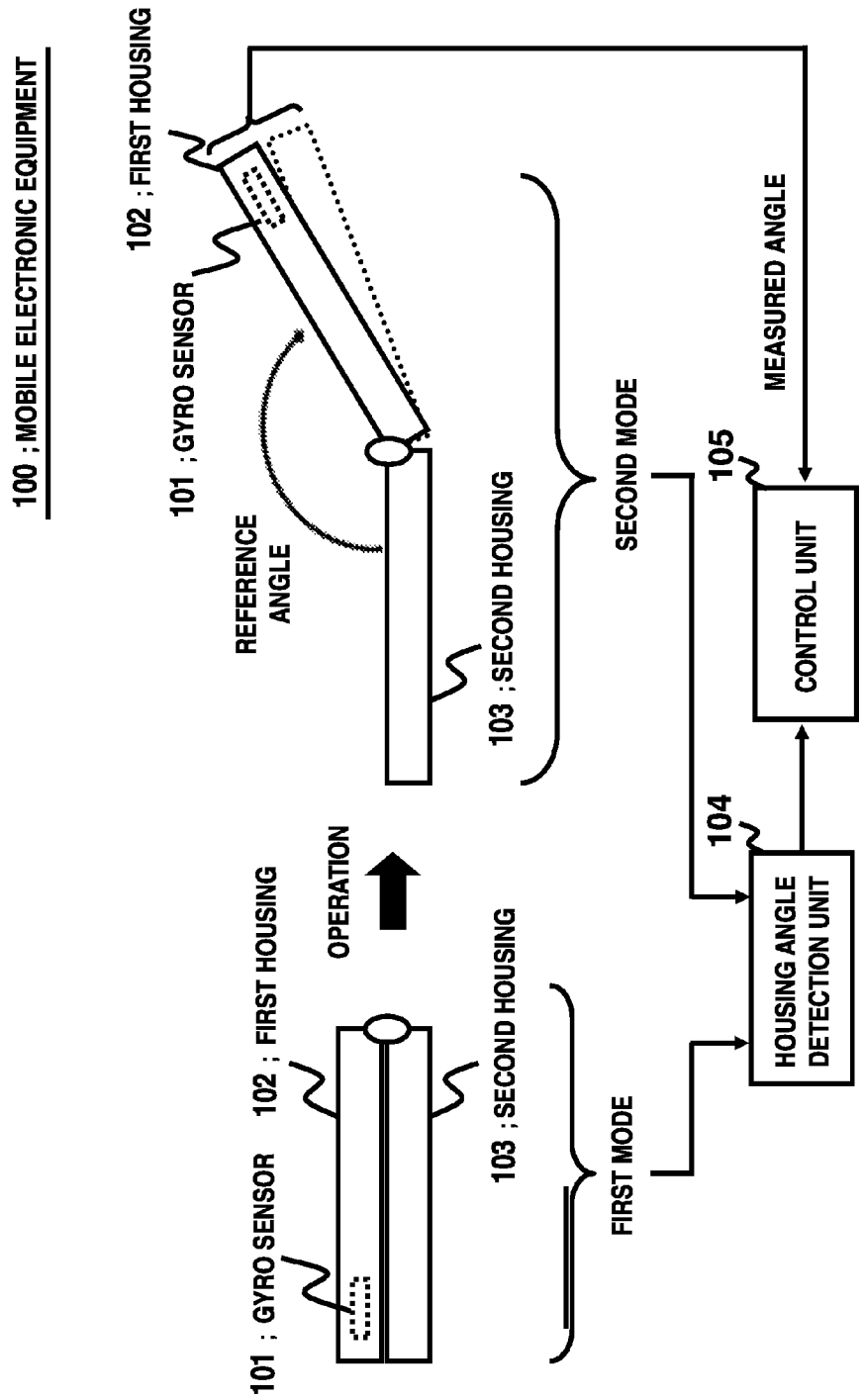
FIG. 1 is a diagram for explaining an overview of an exemplary embodiment.

Then, a mobile electronic equipment 100 shown in FIG. 1 is provided. The mobile electronic equipment 100 shown in FIG. 1 is constituted from a first housing 102 in which a gyro sensor 101 is disposed and a second housing 103 connected to the first housing 102. Operating the mobile electronic equipment 100 by the user to move the first housing 102 changes the mode of the mobile electronic equipment 100 from the first mode to a second mode. When an angle formed between the first housing 102 and the second housing 103 changes, a start of the change of the angle can be detected by a housing angle detection unit 104. Further, the housing angle detection unit 104 can detect a finish of the change of the angle formed between the first housing 102 and the second housing 103.

A control unit 105 in the mobile electronic equipment 100 as described above repeats measurement of an angular velocity using the gyro sensor 101 when the angle formed between the first housing 102 and the second housing 103 starts to change. A change value of the angle formed between the second housing 103 and the first housing 102 which has moved during measurement of the angular velocity is obtained. Then, the control unit 105 cumulatively adds the change value of the angle formed between the first housing 102 and the second housing 103 until the change of the angle is finished, thereby calculating a measured angle formed between the first housing 102 and the second housing 103. On the other hand, an angle to be formed between the first housing 102 and the second housing 103 when the mobile electronic equipment 100 is set to the second mode is known in the design stage of the mobile electronic equipment 100. Thus, this angle is stored in advance in the mobile electronic equipment 100 as a reference angle. Then, by dividing a difference between the reference angle and the angle (measured angle) formed between the first housing 102 and the second housing 103 and then measured by the gyro sensor 101 by a period of time from the start to the finish of the change of the angle formed between the first housing 102 and the second housing 103, the control unit 105 calculates an offset correction value for correcting the output error of the gyro sensor 101.

As described above, calibration of the gyro sensor is executed during the operation that is naturally executed when the user operates the mobile electronic equipment. Thus, the user will not be aware that the calibration of the gyro sensor has been executed. Further, when using a result of measurement by the gyro sensor, an output of the gyro sensor is corrected, based on the offset correction value. The angular velocity and the angle of the mobile electronic equipment with high accuracy can be thereby obtained. A user-friendly mobile electronic equipment can be therefore provided.

According to the present invention, the following modes are possible.

First Mode

See the mobile electronic equipment according to the first aspect described above.

Second Mode

Preferably, the first housing and the second housing may form a first mode and a second mode;
the mobile electronic equipment further comprises:
a housing angle detection unit that may detect a start and a finish of a change in an angle formed between the first housing and the second housing in each of the first mode and the second mode; and
the control unit calculates the measured angle from a value of change in angular velocity during a period of time from the start to the finish of the change in the angle.

Third Mode

Preferably, when the housing angle detection unit detects a start of a change in the angle, the control unit repeats angular velocity acquisition using the gyro sensor, calculates a value of the change in the angle formed between the first housing and the second housing from a period of time in which the first housing moves during the angular velocity acquisition, and then calculates the measured angle from a value of the change in the angle when the housing angle detection unit detects a finish of the change in the angle.

Fourth Mode

Preferably, the control unit divides a value obtained by subtracting the reference angle from the measured angle by the period of time from the start to the finish of the change in the angle detected by the housing angle detection unit, thereby calculating a correction value.

Fifth Mode

Preferably, in the gyro sensor, an angular velocity detection axis of the gyro sensor and a base axis for movement of the first housing are disposed not to be orthogonal.

Sixth Mode

Preferably, the first mode is a mode in which the first housing and the second housing are roughly in close contact with each other; and the second mode is a mode in which the first housing and the second housing form a given angle centering on a connecting point between the first housing and the second housing, and are fixed.

Seventh Mode

Preferably, the housing angle detection unit comprises:
an angle change start detection unit that detects a start of the change in the angle; and
an angle change finish detection unit that detects a finish of the change in the angle.

Eighth Mode

Preferably, the angle change finish detection unit detects the finish of the change in the angle, based on an operation by a user.

Ninth Mode

Preferably, the gyro sensor is a vibration-type gyro sensor.

Tenth Mode

Preferably, the second housing may be fixed by the user during a period of time from the start to the finish of the change in the angle.

Eleventh Mode

Preferably, when the control unit detects that the second housing is not fixed during a period of time from the start to the finish of the change in the angle, the control unit does not calculate the correction value.

Twelfth Mode

Preferably, the first mode is a closed state of the mobile electronic equipment that is foldable, and the second mode is an open state of the mobile electronic equipment that is foldable.

Thirteenth Mode

See the method of correcting a gyro sensor of a mobile electronic equipment according to the second aspect described above.

Fourteenth Mode

Preferably, the first housing and the second housing may form a first mode and a second mode;
the mobile electronic equipment further comprises:
a housing angle detection unit that may detect a start and a finish of the change in the angle formed between the first housing and the second housing in each of the first mode and the second mode; and
the method of correcting a gyro sensor of a mobile electronic equipment further comprises the step of:
calculating the measured angle from a value of a change in angular velocity during a period of time from the start to the finish of the change in the angle.

Fifteenth Mode

Preferably, the method of correcting a gyro sensor of a mobile electronic equipment further comprising the step of:
repeating angular velocity acquisition using the gyro sensor, and then calculating a value of a change in the angle from a period of time in which the first housing moves during the angular velocity acquisition, when the housing angle detection unit further detects a start of the change in the angle.

Sixteenth Mode

Preferably, a value obtained by subtracting a reference angle from the measured angle is divided by a period of time from the start to the finish of the change in the angle detected by the housing angle detection unit, thereby calculating the correction value.

Seventeenth Mode

See the program according to the third aspect described above.

Eighteenth Mode

Preferably, the first housing and the second housing may form a first mode and a second mode;
the mobile electronic equipment further comprises:
a housing angle detection unit that may detect a start and a finish of the change in the angle formed between the first housing and the second housing in each of the first mode and the second mode; and
in the program, the process of calculating the measured angle is executed using a value of a change in the angular velocity during a period of time from a start to a finish of the change in the angle.

Nineteenth Mode

Preferably, in the program, the process of repeating angular velocity acquisition using the gyro sensor and then calculating a value of a change in the angle from a period of time in which the first housing moves during the angular velocity acquisition is executed, when the housing angle detection unit further detects a start of the change in the angle.

Twentieth Mode

Preferably, in the program, a value obtained by subtracting a reference angle from the measured angle is divided by the period of time from the start to the finish of the change in the angle detected by the housing angle detection unit, thereby calculating the correction value.

First Exemplary Embodiment

Figure 2:
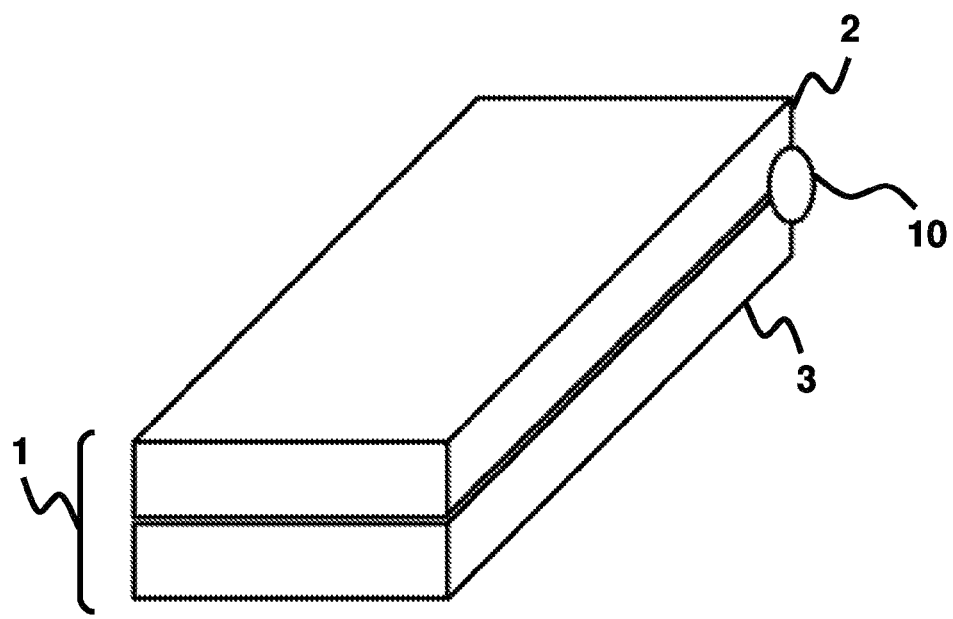
FIG. 2 is a perspective view showing a closed state of a mobile electronic equipment according to a first exemplary embodiment.

Next, a first exemplary embodiment will be described in detail using drawings. FIG. 2 is a perspective view showing a mobile electronic equipment 1 in a closed state according to this exemplary embodiment. The mobile electronic equipment shown in FIG. 2 is constituted from a first housing 2 and a second housing 3. The mobile electronic equipment 1 can be folded with respect to a hinged portion 10. Opening and closing of the mobile electronic equipment 1 is performed by grasping the first housing 2 and moving the first housing upward by a user. A hinged portion having a mechanism for detecting a rotation operation is employed as the hinged portion 10.

Figure 3:
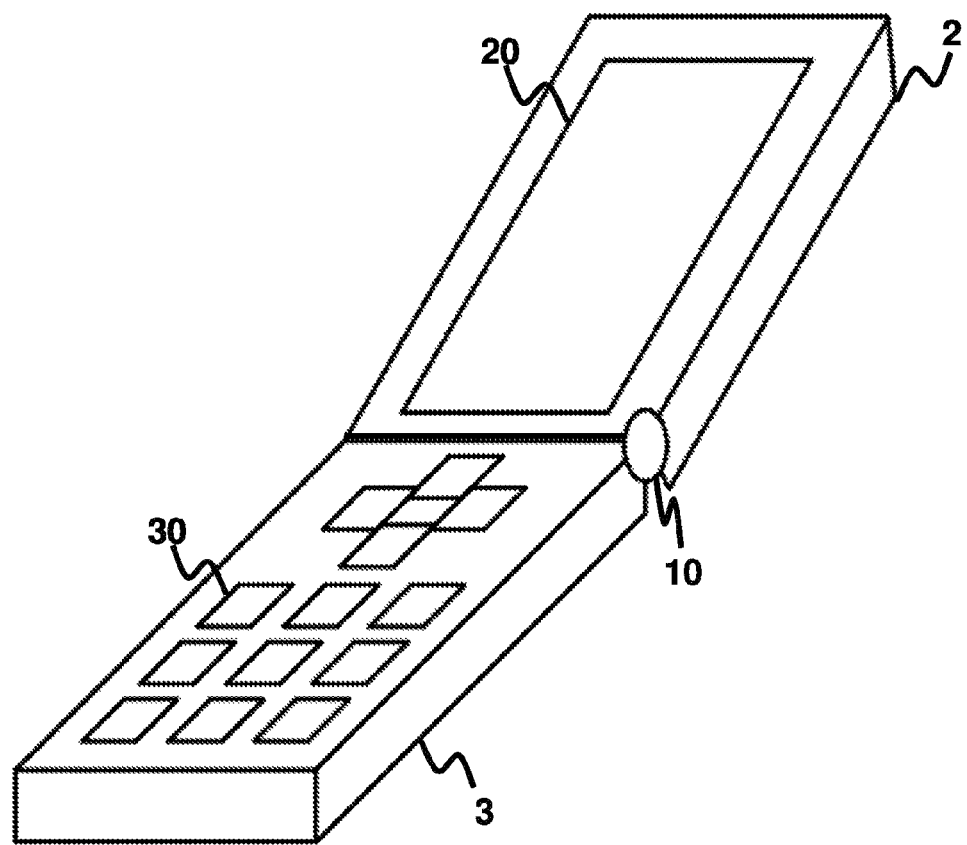
FIG. 3 is a perspective view showing an open state of the mobile electronic equipment according to the first exemplary embodiment.

FIG. 3 is a perspective view showing a state where the mobile electronic equipment 1 is opened. A display unit 20 is disposed on the opened surface of the first housing 2. The second housing 3 includes an operation unit 30. An operation on the mobile electronic equipment 1 by the user is performed through the operation unit 30. A necessary display is made on the display unit 20. A surface where the display unit 20 of the first housing 2 is present is referred to as a display surface, while a surface where the operation unit 30 of the second housing 3 is present is referred to as an operation surface.

Figure 4:
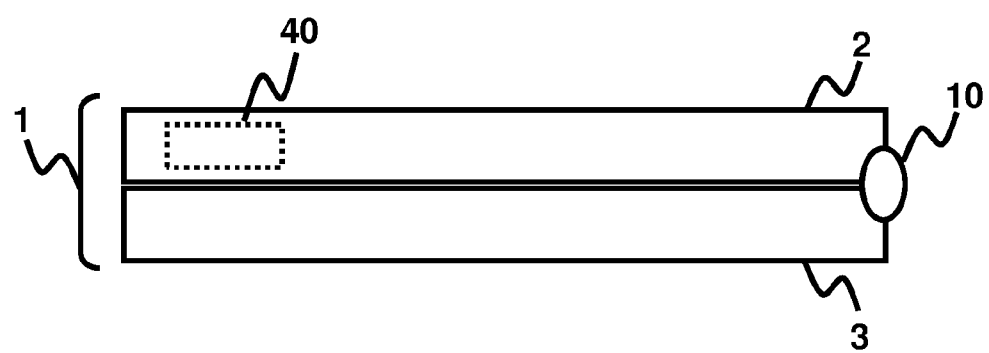
FIG. 4 is a side view of the mobile electronic equipment according to the first exemplary embodiment.

FIG. 4 is a side view of the mobile electronic equipment 1 according to this exemplary embodiment. The mobile electronic equipment 1 includes a gyro sensor 40 inside the first housing 2.

Figure 5:
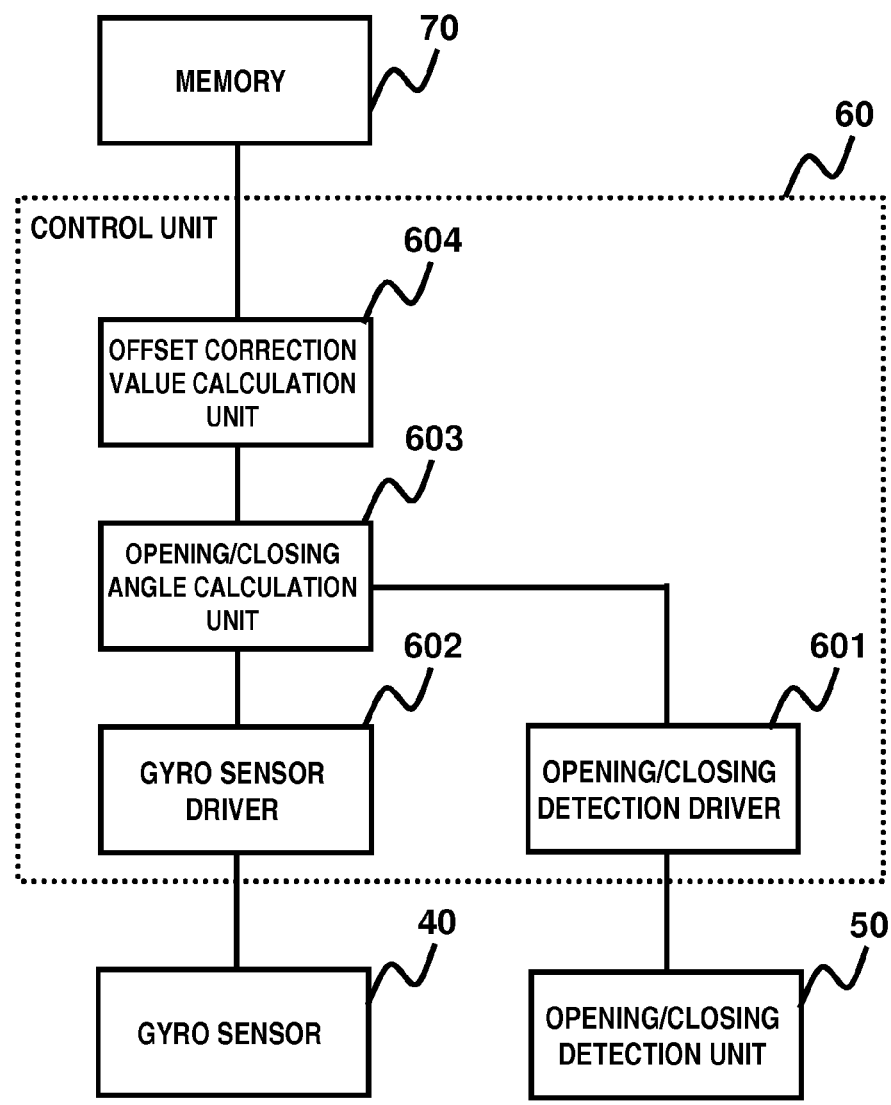
FIG. 5 is a block diagram showing an inner configuration of the mobile electronic equipment in the first exemplary embodiment.

FIG. 5 is a block diagram showing an inner configuration of the mobile electronic equipment 1 according to this embodiment. The mobile electronic equipment 1 shown in FIG. 5 is constituted from the gyro sensor 40, an opening/closing detection unit 50, a control unit 60, and a memory 70.

A vibration-type gyro sensor is employed for the gyro sensor 40, and an output result of the gyro sensor 40 is notified to the control unit 60.

The opening/closing detection unit 50 can detect whether or not the mobile electronic equipment 1 has started to move (an angle formed between the first housing and the second housing starts to change) from a state where the mobile electronic equipment 1 is closed (hereinafter referred to as a closed state) to a state where the mobile electronic equipment 1 is open (hereinafter referred to as an open state) and whether or not the movement to the open state has been finished (the change in the angle formed between the first housing and the second housing has been finished). The opening/closing detection unit 50 corresponds to the above-mentioned housing angle detection unit 104. As a method of detecting the state of the mobile electronic equipment 1 by the opening/closing detection unit 50, a method of detecting the state of the mobile electronic equipment 1 by the rotation mechanism of the hinged portion 10 may be considered. The opening/closing detection unit 50 can detect a start of transition from the open state to the closed state and can also detect completion of the transition to the closed state.

The control unit 60 performs control over the gyro sensor 40 and the opening/closing detection unit 50.

The memory 70 stores information necessary for the mobile electronic equipment 1. The information in that case includes an offset correction value for correcting an output result of the gyro sensor 40.

Further, the control unit 60 is constituted from an opening/closing detection driver 601, a gyro sensor driver 602, an opening/closing angle calculation unit 603, and an offset correction value calculation unit 604.

The opening/closing detection driver 601 performs control over the opening/closing detection unit 50, and notifies the state of the mobile electronic equipment 1 (start or finish of movement) notified from the opening/closing detection unit 50 to the opening/closing angle calculation unit 603.

The gyro sensor driver 602 performs control over the gyro sensor 40, and converts a voltage value output by the gyro sensor 40 to an angular velocity.

The opening/closing angle calculation unit 603 controls the opening/closing detection driver 601 and the gyro sensor driver 602. When the opening/closing angle calculation unit 603 receives the notification of the start of movement from the opening/closing detection driver 601, the opening/closing angle calculation unit 603 requests the gyro sensor 40 to perform angular velocity measurement through the gyro sensor driver 602.

The offset correction value calculation unit 604 calculates a difference value between an angle (measured angle) notified from the opening/closing angle calculation unit 603 and a known angle (reference angle) between the operation surface and the display surface, and divides this difference value by a period of time needed for movement of the first housing 2. This value is an angular velocity offset value of the gyro sensor 40. Thus, this value is stored in the memory 70 as the offset correction value for the gyro sensor 40.

Figure 6:
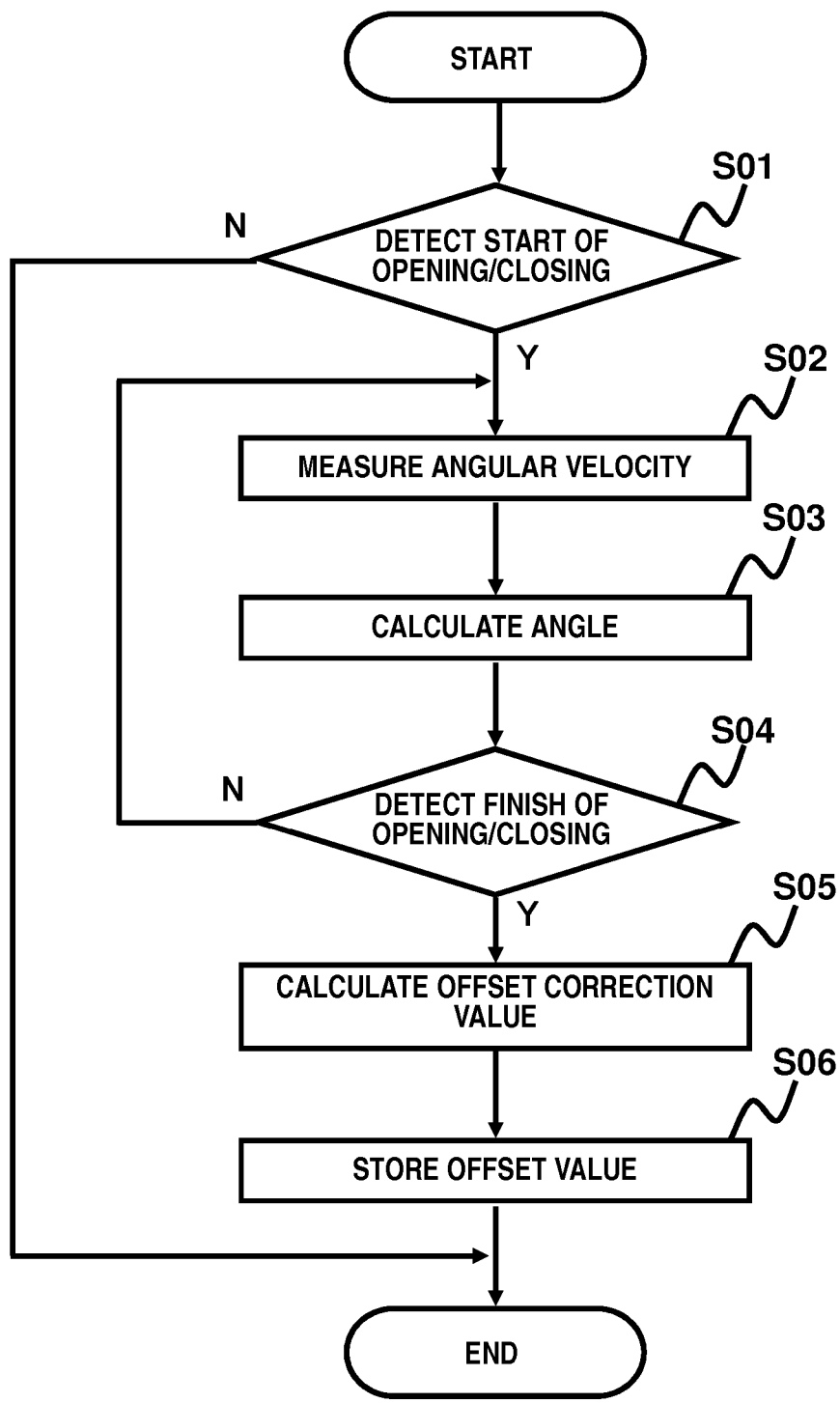
FIG. 6 is a flowchart showing a procedure when an offset correction value for a gyro sensor is calculated.

Next, operation of the mobile electronic equipment 1 according to this exemplary embodiment will be described. FIG. 6 is a flowchart showing a procedure when the offset correction value for the gyro sensor 40 included in the mobile electronic equipment 1 is calculated.

In step S01, it is detected whether or not the mobile electronic equipment 1 has started moving from the closed state to the open state. That is, an operation of opening the mobile electronic equipment 1 by the user is detected. When the user tries to open the mobile electronic equipment 1, the opening/closing detection unit 50 detects the opening operation of the mobile electronic equipment 1. Then, the start of the opening operation of the mobile electronic equipment 1 is notified to the opening/closing detection driver 601. The opening/closing detection driver 601 that has received the notification notifies the opening/closing angle calculation unit 603 that the mobile electronic equipment 1 has started the opening operation.

In step S02, the opening/closing angle calculation unit 603 that has received the notification of the opening operation from the opening/closing detection driver 601 instructs the gyro sensor driver 602 to measure an angular velocity. The gyro sensor driver 602 that has received the instruction obtains the angular velocity from the gyro sensor 40.

In step S03, the gyro sensor driver 602 notifies the angular velocity obtained from the gyro sensor 40 to the opening/closing angle calculation unit 603. The opening/closing angle calculation unit 603 that has received the notification multiplies the angular velocity notified from the gyro sensor driver 602 by the measurement period (sampling period) of the gyro sensor 40, thereby calculating a change in the angle (hereinafter referred to as an angle change value) formed between the first housing 2 and the second housing 3. This angle change value is held in a register or the like.

In step S04, it is checked whether or not the movement of the mobile electronic equipment 1 to the open state has been finished. When the opening/closing detection unit 50 detects the finish of the movement of the mobile electronic equipment 1 to the open state, the opening/closing detection unit 50 notifies the detection to the opening/closing detection driver 601. The opening/closing detection driver 601 that has received the notification notifies the finish of movement of the mobile electronic equipment 1 to the open state to the opening/closing angle calculation unit 603. When the opening/closing angle calculation unit 603 does not receive the notification of the finish of movement of the opening operation, a transition to the step S02 is made to repeat measurement of an angular velocity. In that case, the opening/closing angle calculation unit 603 adds a calculated angle change value to the angle change value held in the register or the like whenever the angle change value is calculated. When the opening/closing angle calculation unit 603 receives the notification of the finish of the opening operation, the opening/closing angle calculation unit 603 notifies the angle change value held in the register or the like and a period of time taken from the start to the finish of the opening operation (hereinafter referred to as a rotation period) of the first housing 2 to the offset correction value calculation unit 604. Then, the procedure transitions to step S05.

In step S05, the offset correction value calculation unit 604 calculates a difference value between the angle change value notified from the opening/closing angle calculation unit 603 and an angle (hereinafter referred to as a reference angle) formed between the first housing 2 and the second housing 3 when the mobile electronic equipment 1 is properly opened. Herein, the angle change value received by the offset correction value calculation unit 604 is the one resulting from cumulative addition of values each derived from multiplication of the angular velocity obtained by the gyro sensor 40 by the measurement period of the angular velocity. Thus, the angle change value is equal to a measurement of the angle (measured angle) formed between the first housing 2 and the second housing 3 in the open state. Accordingly, the offset correction value calculation unit 604 receives the measured angle from the opening/closing angle calculation unit 603. Further, since the reference angle is a constant that has been set in the design stage of the mobile electronic equipment 1, the reference angle is stored in advance in the memory 70 or the like.

A value obtained by dividing a difference value between the measured angle and the reference angle which is a known value by the rotation period notified from the opening/closing angle calculation unit 603 corresponds to an amount of offset drift of the gyro sensor 40. For that reason, when the offset drift value of the gyro sensor 40 is subtracted from the output result of the gyro sensor 40, correction of the gyro sensor 40 can be performed. That is, the offset drift amount can be regarded as the offset correction value for the gyro sensor 40.

In step S06, the offset correction value calculation unit 604 stores the calculated offset correction value in the memory 70.

Figure 7:
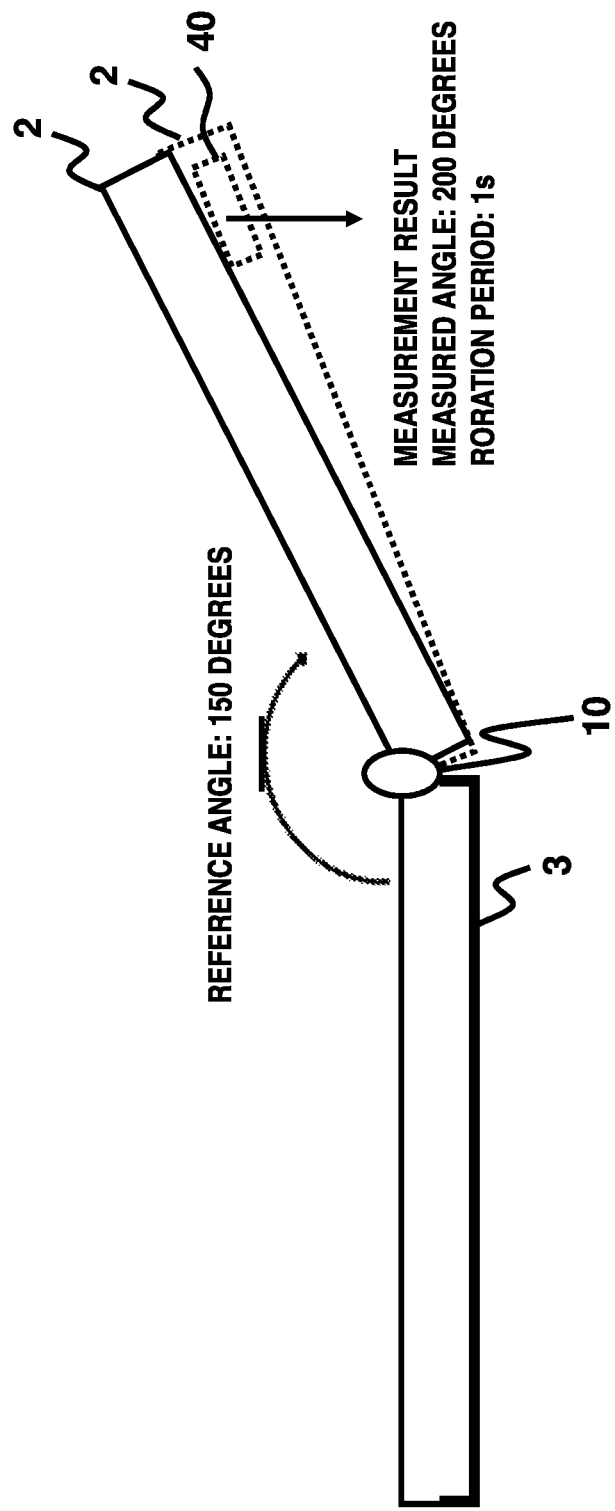
FIG. 7 is a diagram for explaining a relationship between a measurement result obtained from the gyro sensor and an angle formed between a first housing and a second housing.

Now, a relationship among the measured angle, the reference angle, and the offset correction value derived from these angles will be described, using FIG. 7. FIG. 7 is a diagram for explaining a relationship between the measured angle calculated from the angular velocity obtained from the gyro sensor 40 and the angle (reference angle) actually formed between the first housing 2 and the second housing 3. A dotted line in FIG. 7 indicates the position of the first housing 2 estimated based on the output result of the gyro sensor 40. Assume that, when the mobile electronic equipment 1 is in the open state as in FIG. 7, the measured angle and the rotation period notified to the offset correction value calculation unit 604 are 200 degrees and one second, respectively. Then, the reference angle formed between the first housing 2 and the second housing 3 in the open state of the mobile electronic equipment 1 is known in advance to be 150 degrees. Thus, the angular velocity offset correction value for the gyro sensor 40 can be calculated to be 50 degrees/second from (200 degrees−150 degrees)÷1 s. Accordingly, when various applications of the mobile electronic equipment 1 use the output result of the gyro sensor 40, a correct angular velocity can be obtained by subtracting 50 degrees/second from a measured value.

Figure 8:
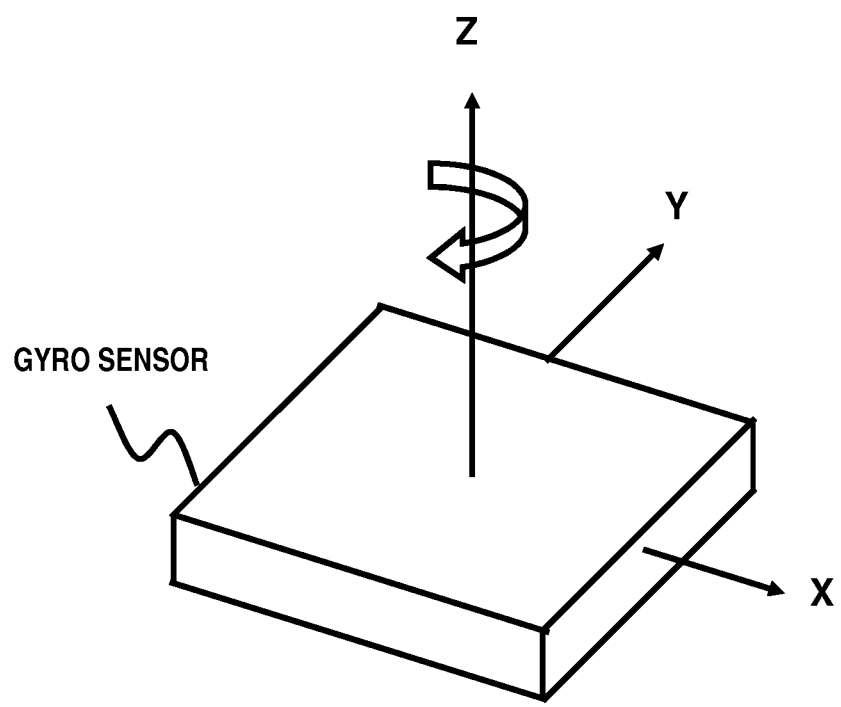
FIG. 8 is a diagram for explaining a detection axis of the gyro sensor and a direction in which detection of an angular velocity is possible.
Figure 9:
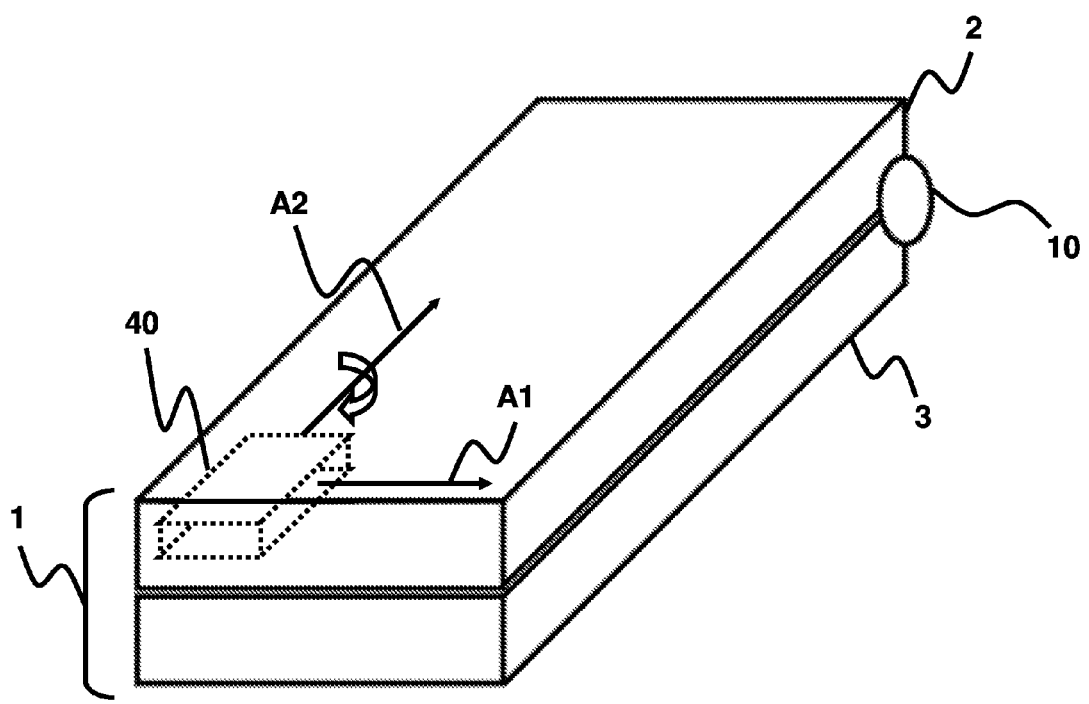
FIG. 9 shows an example of disposition of the gyro sensor where movement of the first housing cannot be detected.

Next, the mounting position of the gyro sensor 40 will be described. Correction of the gyro sensor 40 may not be able to be performed, depending on a relationship between the mounting direction of the gyro sensor 40 and the opening/closing direction of the mobile electronic equipment 1. Assume that the gyro sensor 40 is a gyro sensor having only one detection axis. Then, an angular velocity in a direction orthogonal to the detection axis cannot be measured. That is, in the gyro sensor as shown in FIG. 8, a Z axis is the detection axis, so that rotation based on an X axis or a Y axis cannot be detected. For that reason, when the rotation direction of the first housing 2 is orthogonal to the detection axis of the gyro sensor 40 in the mobile electronic equipment 1, angular velocity measurement cannot be performed by using the gyro sensor 40. An offset correction value for the gyro sensor 40 cannot be therefore calculated. Assume that the gyro sensor 40 is mounted as shown in FIG. 9. An axis A1 in FIG. 9 is an axis used when the first housing 2 of the mobile electronic equipment 1 moves, and an axis A2 is the detection axis of the gyro sensor 40. When the axis A1 and the axis A2 are in an orthogonal relationship, the gyro sensor 40 cannot detect the angular velocity of the mobile electronic equipment 1 even if the mobile electronic equipment 1 has performed an open or closing operation.

Figure 10:
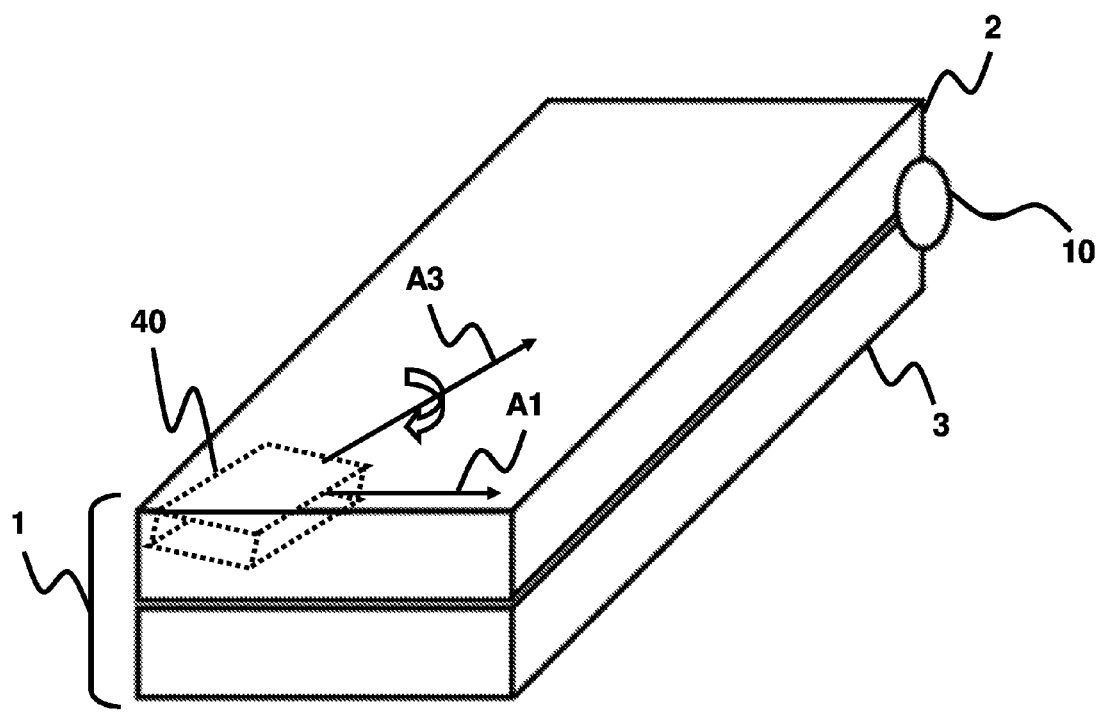
FIG. 10 shows an example of disposition of the gyro sensor where movement of the first housing can be detected.

Then, it is necessary not to cause the rotation axis of the first housing 2 and the detection axis of the gyro sensor 40 to be orthogonal when the gyro sensor 40 is mounted on the substrate of the mobile electronic equipment 1 or the like. The gyro sensor 40 is mounted so that a detection axis A3 of the gyro sensor 40 is not orthogonal to the rotation axis A1 of the mobile electronic equipment 1, as shown in FIG. 10. Referring to FIG. 10, the gyro sensor 40 is mounted shifted from the rotation axis of the first housing 2 by 45 degrees. Consequently, the angular velocity of the first housing 2 in a rotation direction can be detected.

The above description was directed to a method of calculating the offset correction value for the gyro sensor 40 when the mobile electronic equipment 1 is transitioned from the closed state to the open state. An offset correction value for the gyro sensor 40 can be calculated by a similar method also when the mobile electronic equipment 1 transitions from the open state to the closed state.

That is, in step S01 in FIG. 6, the opening/closing detection unit 50 detects a start of a closing operation instead of detecting the start of the opening operation. Then, in step S04, the opening/closing detection unit 50 detects a finish of detection of the closing operation instead of detecting the finish of the opening operation. Then, by notifying detection of each closing operation to the opening/closing detection driver 601, the offset correction value for the gyro sensor 40 can be detected also when the closing operation is performed. For that reason, even if the mobile electronic equipment 1 has been kept in the opened state for a long period of time and calibration of the gyro sensor 40 is necessary, an offset correction value for the gyro sensor 40 can be calculated without requesting the user to perform a special operation.

The second housing needs to be fixed while the user is moving the first housing in order to calculate a correct offset correction value. Thus, provision of a recess in the side surface of the second housing or the like may be considered to reduce fluctuation of the second housing while the user is moving the first housing. Further, when the mobile electronic equipment 1 includes an acceleration sensor and can detect the fluctuation of the second housing, a method of not employing (or cancelling) an offset correction value calculated in that case may be considered.

As described above, by using an opening or closing operation to be performed when the user operates the mobile electronic equipment 1, calculating a difference between the reference angle that is the known value and an angle (measured angle) which is formed between the display surface and the operation surface and can be calculated from an angular velocity obtained by the gyro sensor 40, and then dividing the difference by a rotation period, an offset correction value for the gyro sensor 40 can be calculated. Consequently, an output result of the gyro sensor 40 with high accuracy can be obtained without causing the user to be aware of execution of calibration of the gyro sensor 40. A user-friendly mobile electronic equipment can be therefore provided.

The offset value of the gyro sensor 40 does not greatly vary as long as ambient temperature around the gyro sensor 40 does not abruptly change. On the other hand, the opening or closing operation of the mobile electronic equipment is performed in an extremely short period of time compared with the change in the ambient temperature. Thus, influence of the change in the ambient temperature does not need to be taken into consideration. In this exemplary embodiment, the description was given, assuming that the gyro sensor 40 has one detection axis. Similar offset correction is naturally possible for the gyro sensor having two or three detection axes.

Second Exemplary Embodiment

Next, a second exemplary embodiment will be described in detail with reference to drawings. A mobile electronic equipment 1a according to this exemplary embodiment is not different from the mobile electronic equipment 1 in the first exemplary embodiment in its perspective. Thus, descriptions corresponding to those about FIGS. 2 and 3 will be omitted.

Figure 11:
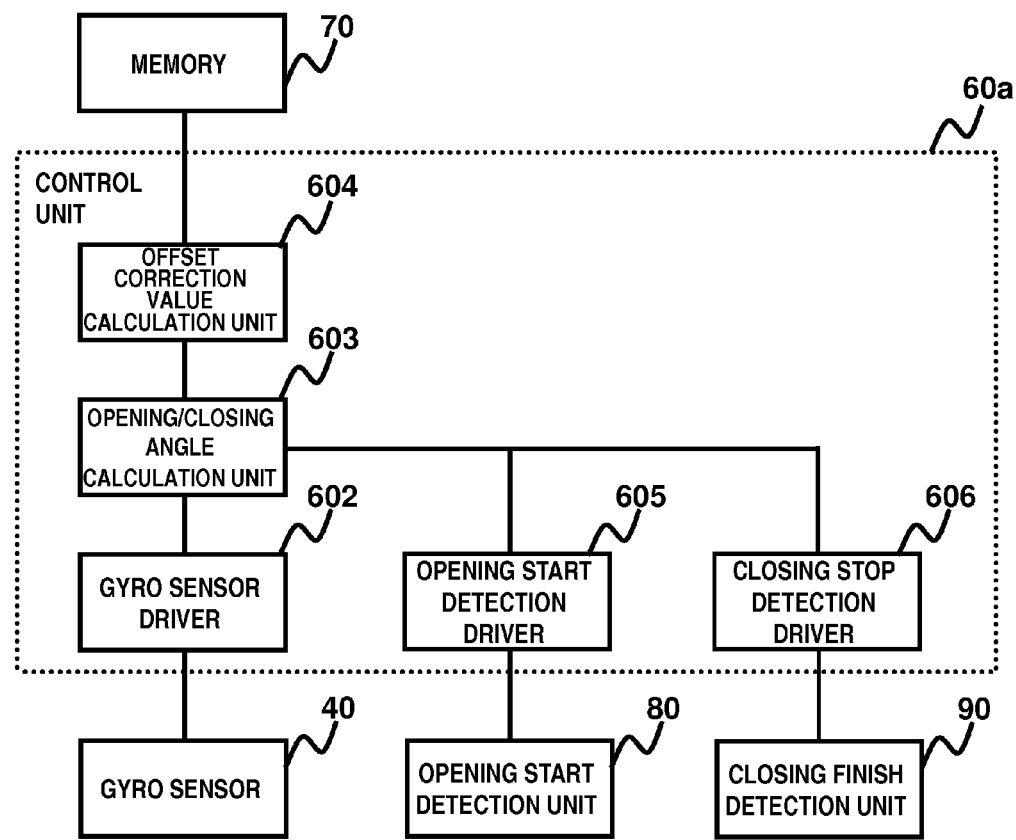
FIG. 11 is a block diagram showing an inner configuration of a mobile electronic equipment in a second exemplary embodiment.

FIG. 11 is a block diagram showing an inner configuration of the mobile electronic equipment 1a according to this exemplary embodiment. Components in FIG. 11 that are the same as those in FIG. 5 are indicated by same reference signs, thereby omitting description of the components in FIG. 11 that are the same as those in FIG. 5. The inner configuration of the mobile electronic equipment 1a shown in FIG. 11 is different from that of the mobile electronic equipment 1 in FIG. 5 in that the mobile electronic equipment 1a includes an opening start detection unit 80, a closing finish detection unit 90, and an opening start detection driver 605 and a closing stop detection driver 606 for controlling these detection units, in place of the opening/closing detection unit 50 and the opening/closing detection driver 601. A hinged portion 10a of the mobile electronic equipment 1a does not include a mechanism for detecting a rotation operation, thereby causing this difference. In order to detect both of an opening operation and a closing operation, different detection units are respectively used for the opening operation and the closing operation.

The opening start detection unit 80 detects a start of the opening operation of the mobile electronic equipment 1a. The opening start detection unit 80 is implemented by providing various sensors such as a Hall element, an illuminance sensor, a proximity sensor, and a pressure sensor, a mechanical switch, and the like inside the display surface or the operation surface, for example.

The closing finish detection unit 90 is for detecting a finish of the opening operation of the mobile electronic equipment 1a. As a detection method by the closing finish detection unit 90, using a start of an operation on the mobile electronic equipment 1a by a user as a trigger may be considered. To take an example, a moment when the user has finished opening (operation) of the mobile electronic equipment 1a and has then first operated the mobile electronic equipment 1a using a touch panel unitarily disposed with the operation unit 30 and the display unit 20 is set to the finish of the opening operation of the mobile electronic equipment 1a.

A period of time to be taken from a transition of the mobile electronic equipment 1a to an open state to execution of a key operation by the user does not cause influence on an offset correction value. It is because an output of the gyro sensor 40 while the gyro sensor 40 is not rotating is an offset value itself, and an offset correction value is derived from division of an angle change value by a period of time taken from a start of movement (transition) of the mobile electronic equipment 1a to the open state to the operation by the user, in which the angle change value is obtained by cumulative addition of offset values.

Figure 12:
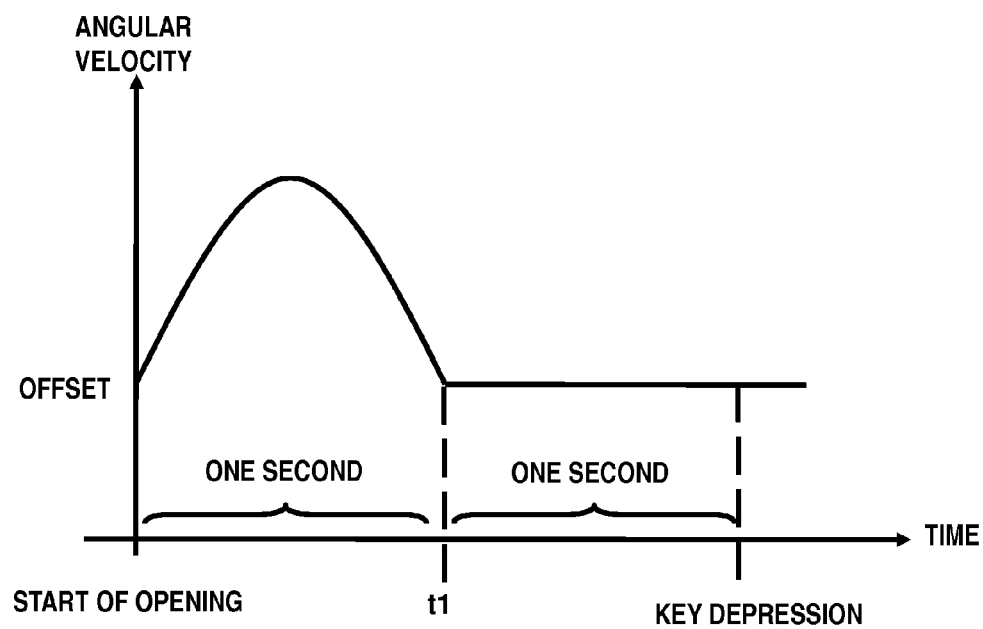
FIG. 12 is a graph showing a change in angular velocity from a start of an opening operation of the mobile electronic equipment to key depression by a user.

FIG. 12 is a graph showing a change in angular velocity from a start of the opening operation of the mobile electronic equipment 1a to a key depression by the user. Assume that the reference angle is set to 150 degrees as in the case of FIG. 7, and an offset is set to 50 degrees/second. FIG. 12 shows a situation where the actual opening operation is completed (at a time t1) after one second from detection of the start of the opening operation of the mobile electronic equipment 1a by the opening start detection unit 80 and then the user has pressed the key after one second from the completion of the actual opening operation. In this case, the reference angle is set to 150 degrees, and the offset is set to 50 degrees. Thus, the measured angle at the time t1 will be 200 degrees. Further, the key depression by the user is performed after one second from the time t1. Thus, a final measured angle is 250 degrees. Consequently, an offset correction value is calculated from (250 degrees−150 degrees)÷2 s, and can be determined to be 50 degrees/second.

As described above, even if the opening or closing operation of the mobile electronic equipment cannot be detected by the mechanism, the open/closed state of the mobile electronic equipment can be determined, so that calibration of the gyro sensor 40 can be performed. Accordingly, it is not necessary to employ a new housing in order to detect the opening or closing operation. As a result, calibration of the gyro sensor can be implemented without increasing the product cost.

Each disclosure of the above-listed cited Patent Literature and the like is incorporated herein by reference. Modification and adjustment of each exemplary embodiment and each example are possible within the scope of the overall disclosure (including the claims) of the present invention and based on the technical concept of the present invention. Various combinations and selections of various disclosed elements (including each element in each claim, each element in each exemplary embodiment and each example, and each element in each drawing) are possible within the scope of the claims of the present invention. That is, the present invention naturally includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof. To take an example, the mobile electronic equipment of a folding type was used as an example in the description of each exemplary embodiment. Correction of a gyro sensor is possible in a mobile electronic equipment including a rotation axis, of which a mode is changed and where an angle that is formed between housings before and after the change is known in advance.

REFERENCE SIGNS LIST 1, 1a, 100 mobile electronic equipment
2, 102 first housing
3, 103 second housing
10, 10a hinged portion
20 display unit
30 operation unit
40, 101 gyro sensor
50 opening/closing detection unit
60, 60a, 105 control unit
70 memory
80 opening start detection unit
90 closing finish detection unit
104 housing angle detection unit
601 opening/closing detection driver
602 gyro sensor driver
603 opening/closing angle calculation unit
604 offset correction value calculation unit
605 opening start detection driver
606 closing stop detection driver

What is claimed is:

1. A mobile electronic equipment, comprising:
a gyro sensor that detects an angular velocity;
a first housing with the gyro sensor disposed therein;
a second housing movably connected to the first housing, an angle formed between the first housing and the second housing being changed by movement of at least one of the first housing and the second housing;
wherein the first housing and the second housing form a first mode and a second mode;
a housing angle detection unit configured to detect a start and a finish of a change in an angle formed between the first housing and the second housing in each of the first mode and the second mode;
a control unit configured to calculate the change in the angle formed between the first housing and the second housing in each of the first mode and the second mode before and after a movement as a measured angle, based on output data of the gyro sensor, and calculate a correction value for the output data of the gyro sensor based on the measured angle and a reference angle set in advance, the reference angle being an angle formed between the first housing and the second housing when the mobile electronic equipment is opened,
wherein the control unit is further configured to calculate the measured angle from a value of change in angular velocity during a period of time from the start to the finish of the change in the angle; and wherein when the housing angle detection unit detects the start of the change in the angle, the control unit is configured to repeat angular velocity acquisition using the gyro sensor, calculate a value of the change in the angle formed between the first housing and the second housing from a period of time in which the first housing moves during the angular velocity acquisition, calculate the measured angle from a value of the change in the angle when the housing angle detection unit detects the finish of the change in the angle; and
wherein the control unit is configured to calibrate the gyro sensor by automatically correcting the output data of the gyro sensor using the correction value.

2. The mobile electronic equipment according to claim 1, wherein
the control unit is further configured to divide a value obtained by subtracting the reference angle from the measured angle by the period of time from the start to the finish of the change in the angle detected by the housing angle detection unit, thereby calculating the correction value.

3. The mobile electronic equipment according to claim 1, wherein
in the gyro sensor, an angular velocity detection axis of the gyro sensor and a base axis for movement of the first housing are disposed not to be orthogonal.

4. The mobile electronic equipment according to claim 1, wherein
the first mode is a mode in which a surface of the first housing and a surface of the second housing are in contact with each other; and the second mode is a mode in which the first housing and the second housing form a given angle centering on a connecting point between the first housing and the second housing, and are fixed.

5. The mobile electronic equipment according to claim 1, wherein
the housing angle detection unit comprises:
an angle change start detection unit configured to detect the start of the change in the angle; and
an angle change finish detection unit configured to detect the finish of the change in the angle.

6. The mobile electronic equipment according to claim 5, wherein
the angle change finish detection unit is further configured to detect the finish of the change in the angle, based on an operation by a user.

7. The mobile electronic equipment according to claim 1, wherein
the gyro sensor is a vibration-type gyro sensor.

8. The mobile electronic equipment according to claim 1, wherein
the second housing is configured to be fixed by a user during the period of time from the start to the finish of the change in the angle.

9. The mobile electronic equipment according to claim 1, wherein
when the control unit is further configured to detect that the second housing is not fixed during the period of time from the start to the finish of the change in the angle, the control unit does not calculate the correction value.

10. The mobile electronic equipment according to claim 1, wherein
the first mode is a closed state of the mobile electronic equipment that is foldable, and the second mode is an open state of the mobile electronic equipment that is foldable.

11. A method of correcting a gyro sensor of a mobile electronic equipment, comprising:
using a mobile electronic equipment which comprises:
a gyro sensor that detects an angular velocity;
a first housing with the gyro sensor disposed therein;
a second housing movably connected to the first housing, an angle formed between the first housing and the second housing being changed by movement of at least one of the housings,
wherein the first housing and the second housing form a first mode and a second mode; a housing angle detection unit; and
a control unit;
the method further comprising:
detecting a start and a finish of a change in an angle formed between the first housing and the second housing in each of the first mode and the second mode;
calculating the change in the angle formed between the first housing and the second housing before and after a movement as a measured angle, based on output data of the gyro sensor;
calculating a correction value for the output data of the gyro sensor based on the measured angle and a reference angle set in advance, the reference angle being an angle formed between the first housing and the second housing when the mobile electronic equipment is opened;
calculating the measured angle from a value of change in angular velocity during a period of time from the start to the finish of the change in the angle; and
when the start of the change in the angle is detected, repeating angular velocity acquisition using the gyro sensor, and calculating a value of the change in the angle from a period of time in which the first housing moves during the angular velocity acquisition, and when the finish of the change in the angle is detected, calculating the measured angle from a value of the change in the angle and calibrating the gyro sensor by automatically correcting the output data of the gyro sensor using the correction value.

12. The method of correcting a gyro sensor of a mobile electronic equipment according to claim 11, wherein
a value obtained by subtracting a reference angle from the measured angle is divided by a period of time from the start to the finish of the change in the angle detected by the housing angle detection unit, thereby calculating the correction value.

13. A computer readable non-transitory medium storing a program for causing a computer that controls a mobile electronic equipment, wherein the program executes by using a mobile electronic equipment comprising:
a gyro sensor that detects an angular velocity;
a first housing with the gyro sensor disposed therein;
a second housing movably connected to the first housing, an angle formed between the first housing and the second housing being changed by movement of at least one of the housings,
wherein the first housing and the second housing form a first mode and a second mode;
a housing angle detection unit; and
a control unit;
the program causing the computer to execute processes of:
detecting a start and a finish of a change in an angle formed between the first housing and the second housing in each of the first mode and the second mode;
calculating the change in the angle formed between the first housing and the second housing before and after a movement as a measured angle, based on output data of the gyro sensor;
calculating a correction value for the output data of the gyro sensor based on the measured angle and a reference angle set in advance, the reference angle being an angle formed between the first housing and the second housing when the mobile electronic equipment is opened;
calculating the measured angle from a value of change in angular velocity during a period of time from the start to the finish of the change in the angle;
when the start of the change in the angle is detected, repeating angular velocity acquisition using the gyro sensor, and calculating a value of the change in the angle from a period of time in which the first housing moves during the angular velocity acquisition, and when the finish of the change in the angle is detected, calculating the measured angle from a value of the change in the angle and calibrating the gyro sensor by automatically correcting the output data of the gyro sensor using the correction value.

14. The computer readable non-transitory medium according to claim 13, wherein a value obtained by subtracting a reference angle from the measured angle is divided by the period of time from the start to the finish of the change in the angle detected by the housing angle detection unit, thereby calculating the correction value.

* * * * *